United States Patent
Lo

(10) Patent No.: US 9,866,425 B1
(45) Date of Patent: Jan. 9, 2018

(54) SYSTEMS AND METHODS FOR OPERATIONS, ADMINISTRATION AND MAINTENANCE (OAM) IN THE PHYSICAL CODING SUBLAYER (PCS)

(71) Applicant: Marvell International Ltd., Hamilton (BM)

(72) Inventor: William Lo, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 195 days.

(21) Appl. No.: 14/972,776

(22) Filed: Dec. 17, 2015

Related U.S. Application Data

(60) Provisional application No. 62/099,874, filed on Jan. 5, 2015, provisional application No. 62/099,881, filed on Jan. 5, 2015.

(51) Int. Cl.
| | | |
|---|---|---|
| *H04L 1/00* | (2006.01) | |
| *H04L 12/26* | (2006.01) | |
| *H04L 12/24* | (2006.01) | |
| *H04L 29/08* | (2006.01) | |
| *H04L 12/70* | (2013.01) | |

(52) U.S. Cl.
CPC .......... *H04L 41/042* (2013.01); *H04L 69/323* (2013.01); *H04L 2012/5625* (2013.01)

(58) Field of Classification Search
CPC ............................................. H04L 2012/5625
USPC .................................. 370/236, 236.1, 236.2
See application file for complete search history.

(56) References Cited

U.S. PATENT DOCUMENTS

| | | | | |
|---|---|---|---|---|
| 5,710,760 A * | 1/1998 | Moll | ...................... | H04L 43/50 370/249 |
| 6,542,268 B1 * | 4/2003 | Rotolo | ................ | H04J 14/0204 369/44.23 |
| 6,865,602 B1 * | 3/2005 | Nijemcevic | ......... | H04L 41/0213 370/241.1 |
| 2004/0165534 A1 * | 8/2004 | Claseman | ............. | H04L 1/0061 370/241.1 |
| 2009/0110108 A1 * | 4/2009 | Kennedy | ............ | H04B 1/71635 375/295 |
| 2009/0193408 A1 * | 7/2009 | Ok | ...................... | H04L 41/0806 717/170 |
| 2011/0142448 A1 * | 6/2011 | Zou | .................... | H04Q 11/0067 398/58 |
| 2012/0069742 A1 * | 3/2012 | Kaufmann | .......... | H04L 43/0811 370/242 |

(Continued)

*Primary Examiner* — Marsha D. Banks Harold
*Assistant Examiner* — Elton Williams

(57) ABSTRACT

Systems and methods described herein provide a method for operation, administration and maintenance (OAM) of data message transmission. The method comprises reading a transmit register of a transmitter associate with a first management entity to determine a transmit status of the transmit register. The method further comprises loading a data message into the transmit register when the transmit status of the transmit register indicates availability. The method further comprises embedding the data message as an out-of-band message with physical code sublayer modulation, and transmitting the out-of-band message on the physical code sublayer to a receiver associated with a second management entity. A transmit state machine of the transmitter and a receive state machine of the receiver establish a handshake to allow the out-of-band message to be passed asynchronously.

20 Claims, 12 Drawing Sheets

(56) References Cited

U.S. PATENT DOCUMENTS

2013/0156420 A1* 6/2013 Amitai ............. H04B 10/07953
                                                    398/27
2015/0016473 A1* 1/2015 Wakabayashi .......... H04L 69/22
                                                    370/474
2016/0344630 A1* 11/2016 Lee ....................... H04L 45/745

* cited by examiner

SYSTEMS AND METHODS FOR OPERATIONS, ADMINISTRATION AND MAINTENANCE (OAM) IN THE PHYSICAL CODING SUBLAYER (PCS)

CROSS-REFERENCE TO RELATED APPLICATION

This disclosure claims the benefit of U.S. Provisional Patent Application No. 62/099,874, filed Jan. 5, 2015, and U.S. Provisional Patent Application No. 62/099,881, filed Jan. 5, 2015, both of which are hereby incorporated by reference herein in their entirety.

FIELD OF USE

This disclosure relates to operations, administration and maintenance (OAM) in the physical coding sublayer (PCS), for example, in the Fast Ethernet, gigabit Ethernet, and/or the 10 Gigabit Ethernet standards.

BACKGROUND OF THE DISCLOSURE

In a communication network, an OAM mechanism monitors and manages processes and activities involved with operating, administering, managing and maintaining a computer system. Existing OAM tools include connectivity fault management or the link layer discovery. These OAM tools are often implemented in the link layer or higher layers.

SUMMARY

Systems and methods described herein provide a method for operation, administration and maintenance (OAM) of data message transmission. The method comprises reading a transmit register of a transmitter associate with a first management entity to determine a transmit status of the transmit register. The method further comprises loading a data message into the transmit register when the transmit status of the transmit register indicates availability. The method further comprises embedding the data message as an out-of-band message with physical code sublayer modulation, and transmitting the out-of-band message on the physical code sublayer to a receiver associated with a second management entity. A transmit state machine of the transmitter and a receive state machine of the receiver establish a handshake to allow the out-of-band message to be passed asynchronously.

In some implementations, the out-of-band message is used for OAM of the first management entity and the second management entity.

In some implementations, the data message is transferred from the transmit register to a transmit state machine. The data message is written to the transmit register by the first management entity. The data message is further transmitted from the transmit state machine to a receiver when the receive state machine is ready to receive.

In some implementations, the transmit register receives an acknowledgement signal when the out-of-band message has been successfully received at the receiver.

In some implementations, a next data message is transmitted from the transmitter to the receiver when an acknowledgement of the out-of-band message is received.

In some implementations, the OAM of data message transmission stalls with up to three data messages without asynchronously reading the pending data message from the receive register.

In some implementations, the receiver comprises a receive register that is asynchronously read by the second management entity, and sends an acknowledgement message when the out-of-band message is received error free.

In some implementations, the first management entity and the second management entity transmit data messages bi-directionally.

In some implementations, the physical code sublayer modulation is in compliance with the 1000BASE-T1 physical layer standard.

In some implementations, a first management entity passes a physical layer health information to a link partner, and the physical layer health information is used to maintain a connection between the physical layer and the link partner.

In accordance with another embodiment is provided a a system for OAM of data message transmission. The system comprises a memory unit and a processor communicatively coupled to the memory unit. The processor is configured to read a transmit register of a transmitter associate with a first management entity to determine a transmit status of the transmit register. The processor is further configured to load a data message into the transmit register when the transmit status of the transmit register indicates availability. The processor is further configured to embed the data message as an out-of-band message with physical code sublayer modulation, and transmit the out-of-band message on the physical code sublayer to a receiver associated with a second management entity. A transmit state machine of the transmitter and a receive state machine of the receiver establish a handshake to allow the out-of-band message to be passed asynchronously.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

This disclosure describes methods and systems for an OAM scheme that can be adopted by the IEEE 802.3 bp standards. Specifically, the OAM scheme allows transmission of out-of-band messages from one management entity to another by embedding the out-of-band message in the physical code sublayer (PCS) modulation.

Throughout this disclosure, the following definitions will be used: an "OAM field" is defined as a 9-bit symbol that is inserted in the reconciliation sublayer (RS) frame during normal operation, or an XOR operation into the refresh cycle during lower power idle (LPI) state; an "OAM frame" is defined as a collection of 12 consecutive 9-bit symbols; an "OAM message" is defined as an 8-byte message plus 4 bits that identify one of the 16 possible message numbers; a "management entity" is defined as an agent that exchanges management information with its peer, and the interaction occurs over the OAM transmit and receive registers. The transmit OAM registers include information that is loaded into these registers to be transmitted to the link partner. The receive OAM register includes information that is received and is read from these registers.

The OAM model can provide an optional mechanism useful for monitoring a link operation such as exchanging physical layer (PHY) link health status and message exchange for the 1000BASE-T1 PCS layer. The OAM information is exchanged in-band between two PHYs without using any of the normal data bandwidth. The OAM can be implemented between two 1000BASE-T1 PHYs on the physical layer. The OAM can continue to operate during low power idle (LPI) albeit the information is transferred at a slower rate during the refresh cycle. The 1000BASE-T1 reconciliation sublayer (RS) frame has a 9-bit reserved field that can be used to exchange OAM frames. The implementation of the OAM frame exchange function may be optional. However, if 1000BASE-T1 EEE is implemented, then the OAM frame exchange function can be implemented to exchange at minimum the link partner health status.

The OAM scheme can reuse the 12-byte information field mechanism that is used during data training. Data training and OAM are mutually exclusive so the hardware for data training can be reused. An OAM packet can have a 10-byte payload and 17 bits cyclic redundancy check (CRC). The OAM scheme can be implemented in the IEEE 802.3 bp 1000BASE-T1 PCS layer, instead of the traditional OAM models that normally occur in the link layer or a higher layer. In this way, hardware use in the physical layer can be balanced when a number of data bytes are exchanged, e.g., the hardware can be configured to exchange 8-byte messages, and the messages can be numbered to send 16 different 8-byte messages, resulting in data transmission of 128 bytes in total.

Figure 1:
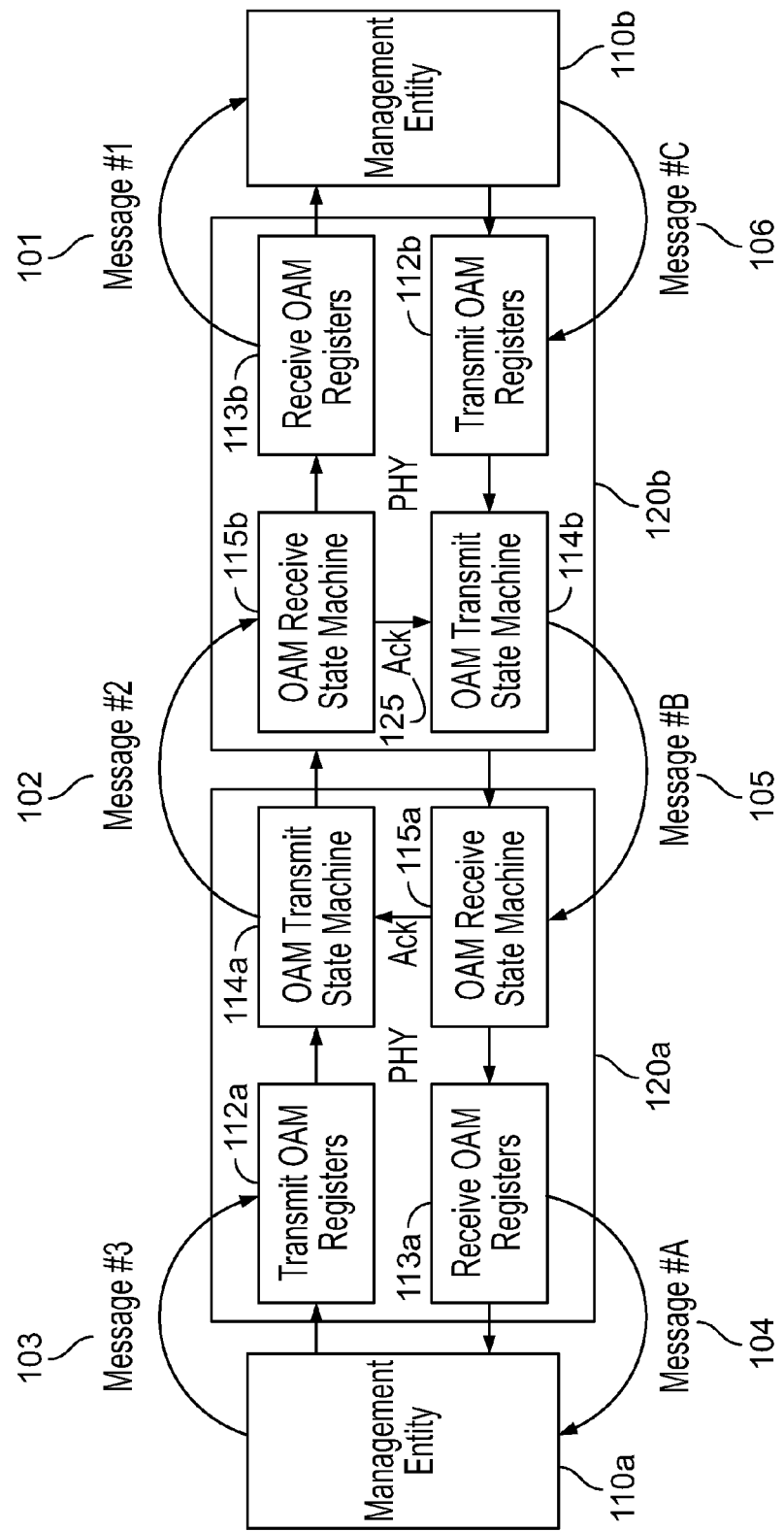
FIG. 1 provides an exemplary block diagram illustrating an example OAM model including various entities and OAM messages passing therebetween.

FIG. 1 provides an exemplary block diagram illustrating an example OAM model, including various entities and OAM messages passing therebetween. Two management entities 110*a-b* may exchange OAM messages 101-106 by asynchronously interacting with OAM registers 112*a-b* and 113*a-b* on the two 1000BASE-T1 PHYs 120*a-b*. The OAM messages may atomically transfer between OAM registers and state machines, e.g., from transmit OAM registers 112*a* to OAM transmit state machine 114*a*, and/or the like. The two PHYs 120*a-b* may support three OAM messages (e.g., 101-103, 104-106) in-flight in each direction. The received OAM messages can be acknowledged by the OAM receive state machine 115*a-b*.

Figure 2:
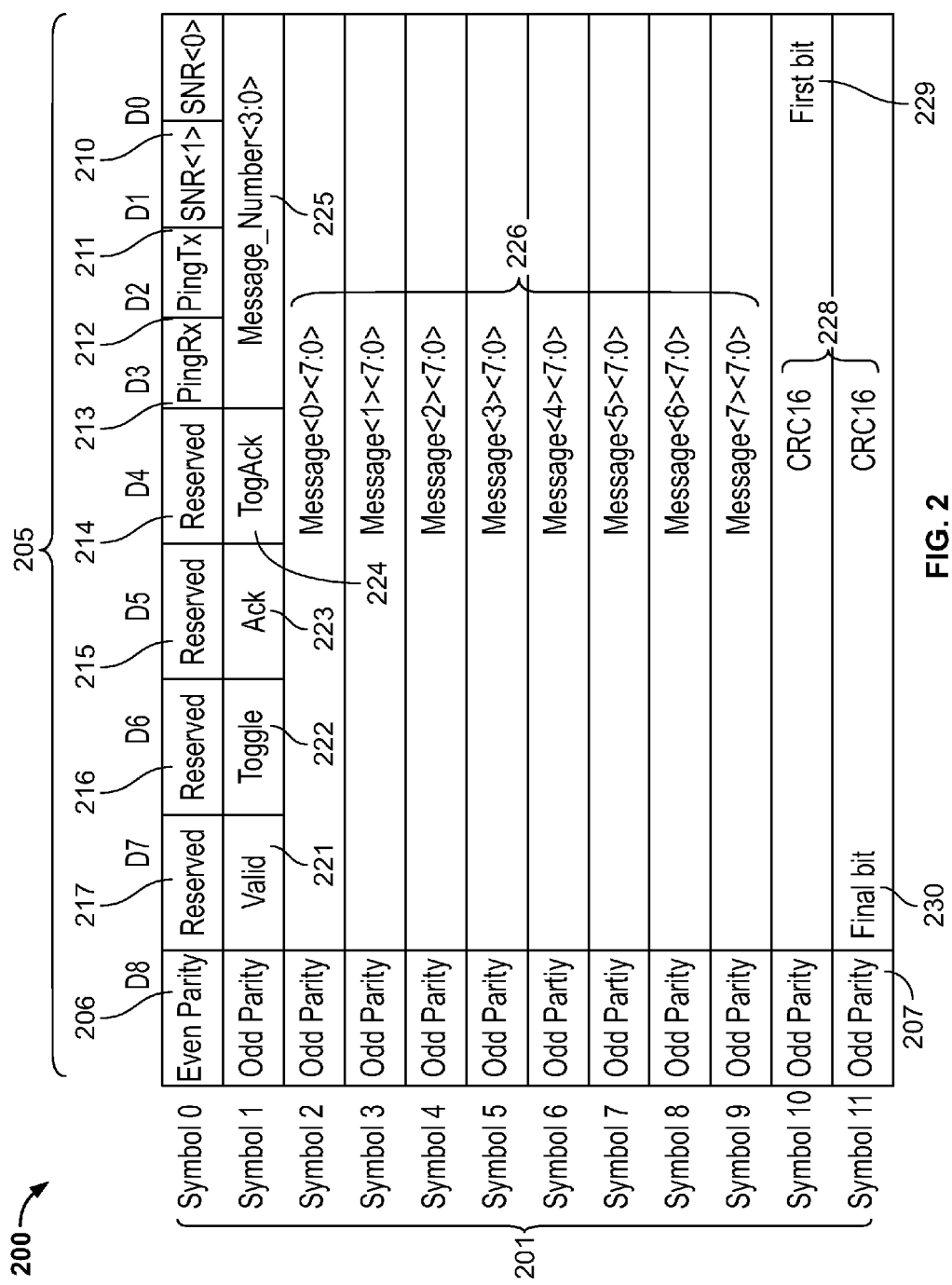
FIG. 2 provides an exemplary block diagram illustrating an example data structure of an OAM frame.

FIG. 2 provides an exemplary block diagram illustrating an example data structure of an OAM frame 200. Each OAM frame 200 is made up of 12 bytes of data symbols 201 and 12 parity bits. Each symbol consists of eight bits of data 205 and one parity bit. The parity bit value for symbol 0 should be a value chosen in a way such that the sum of the number of is in the nine bits is even (e.g., 206). The parity bit value for symbols 1 to 11 should be such that the sum of the number of is in the nine bits is odd (e.g., 207).

An OAM frame symbol is placed in the nine-bit OAM field in each RS frame during normal operation. An OAM frame symbol is placed in the 9-bit OAM field in each refresh cycle during LPI. The 12 OAM frame symbols are consecutively inserted into 12 consecutive RS frames and/or refresh cycles. Once the 12 symbols of the current OAM frame are inserted, the 12 symbols of the next OAM frame are inserted. This process is continuous without any break in the insertion of OAM frame symbols.

Bit 0 of each OAM frame symbol is the first bit transmitted in the 9-bit OAM field. Symbol 0 is the first symbol transmitted in each OAM frame. The OAM frame boundary can be found at the receiver by determining the symbol parity. For example, symbol 0 has even parity (206) while all other symbols have odd parity (207); thus an even parity bit marks the OAM frame boundary. If OAM is not implemented then the 9-bit OAM field shall be set to all Os. If the link partner does not implement OAM, the 9-bit OAM field will remain static and the symbol parity will not change.

As shown in FIG. 2, using OAM<x><y> to represent symbol x, bit y of the frame, reserved fields 214-217 may be set to 0. The Ping Rx 213 is indicated in OAM<0><3>. This bit is set by the PHY to the same value as the Ping Tx 212 bit, which is indicated in OAM<0><2> received from the link partner to echo on Ping Rx bit.

The PHY Health (SNR<1:0>211-210) is indicated in OAM<0><1:0>. This status is set by the PHY to indicate the status of the receiver. The definitions of a good status, a marginal status, or a state to request idles, and a state to request retrain can be implementation-dependent. For example, SNR<1:0>=00 may indicate a PHY link is dying and will drop link and re-link within two to four ms after the end of the current OAM frame. SNR<1:0>=01 may indicate that LPI refresh is insufficient to maintain PHY SNR. The link partner can be requested to exit LPI and to send idles (used only when EEE is enabled). SNR<1:0>=10 may indicate PHY SNR is marginal. SNR<1:0>=11 may indicate PHY SNR is good.

The OAM message valid 221 is indicated in OAM<1><7>. When the field value is 0, the current OAM frame does not contain a valid OAM message; and when the value is 1, the current OAM frame contains a valid OAM message.

The OAM message toggle 222 is indicated in OAM<1><6>. The toggle bit is used to ensure proper OAM message synchronization between the PHY and the link partner. The toggle bit in the current OAM message is set to the opposite value of the toggle bit in the previous OAM message only if the link partner acknowledges that the OAM message is received. This allows an OAM message to be delineated from a second OAM message, as the same OAM message may be repeated over multiple OAM frames. This toggle bit 222 is valid only if the valid field 221 is set to 1.

The OAM message Acknowledge (ACK) 223 is indicated in OAM<1><5>. ACK is set by the PHY to let the link partner know that the OAM message sent by the link partner is successfully received and the PHY is ready to accept a new OAM message, with 0 indicating no acknowledgement and 1 indicating acknowledgement.

The OAM message Toggle Acknowledge (TogAck 224) is indicated in OAM<1><4>. TogAck is set by the PHY to let the link partner know which OAM message is being acknowledged. TogAck takes the value of Toggle 222 bit of the OAM message being acknowledged. This bit is valid only if ACK 223 is set to 1.

The OAM message number 225 is indicated in OAM<1><3:0>. This field is user-defined but can be used to indicate the meaning of the eight-byte message that follows. If used this way, up to 16 different 8 byte messages can be exchanged.

The OAM message data 226 is indicated in OAM<9: 2><7:0>. The eight-byte message data can be user-defined ACK 223 is set by the PHY to let the link partner know that the OAM frame sent by the link partner is successfully received. The OAM frame byte is the lower eight-bits of the nine-bit OAM symbol.

Figure 3:
FIG. 3 provides an exemplary block diagram illustrating an example of cyclic redundancy check (CRC).

The CRC16 228 is indicated in OAM<11:10><7:0>. The CRC16 implements the polynomial $(x+1)(x^{15}+x+1)$ of the previous 10 bytes. The CRC16 shall produce the same result as the implementation shown in FIG. 3. The 16 delay elements $S_0, \ldots, S_{15}$ in FIG. 3 can be initialized to zero. Afterwards the OAM message data 226 OEM<9:0><7:0> presented in their transmitted order can be used to compute the CRC16 with the switch 302 connected, which is setting the CRC generator 301 in FIG. 3. Here the parity bit is not used in the CRC16 calculation. After all the 10 bytes have been processed, the switch 302 is disconnected (setting to CRC out 303) and the 16 values stored in the delay elements $S_0, \ldots, S_{15}$ are transmitted in the order as illustrated, e.g., first $S_{15}$, followed by $S_{14}$, and so on, until the final value $S_0$ is transmitted. $S_{15}$ is indicated in OAM<10><0> as the first bit 229, and $S_0$ is indicated in OAM<11><7> as the final bit 230.

Figure 4:
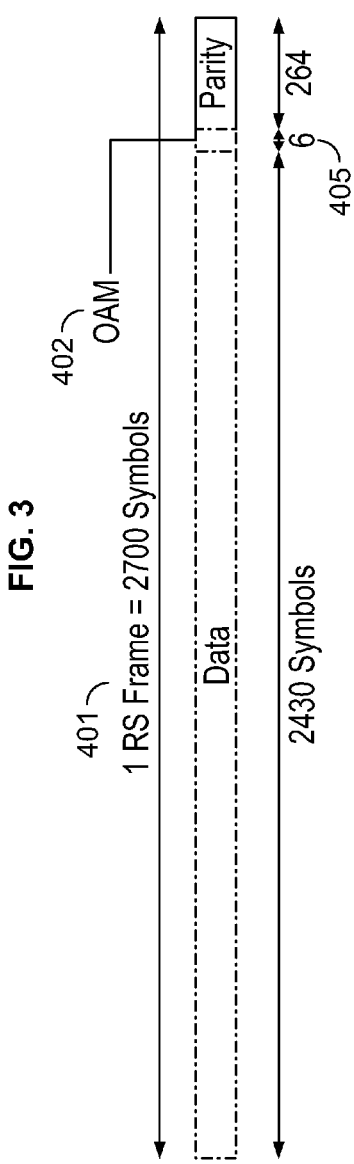
FIGS. 4-5 provide example data diagrams illustrating aspects of OAM symbol insertion.
Figure 5:

FIGS. 4-5 provide example data diagrams illustrating aspects of OAM symbol insertion. As shown in FIG. 4, during normal operation of a system (e.g., normal power level), a nine-bit OAM symbol 402 may be inserted into the OAM field in each RS frame 401, which contains 2700 symbols. The OAM field is scrambled and converted to pulse-amplitude modulation-3 (PAM-3) in the RS frame 401, e.g., including six PAM-3 symbols, see 405. Twelve RS frames may be used per OAM frame, which results in a transmission time of 12×3.6 µs=43.2 µs per OAM frame.

FIG. 5 shows a scenario of OAM symbol insertion during the LPI state. In the respective example in FIG. 5, the LPI quiet state 510 may occur for a period of 24 RS frames with a refresh pattern of 1080 symbols at the end of each cycle. For example, a nine-bit OAM symbol 501 may be inserted into the OAM field in each refresh cycle 402. The OAM field can be XOR into the scrambled sequence and converted to a PAM-3 symbol in the refresh cycle. Thus, the twelve refresh cycle per OAM frame may result in 12×(24×3.6 µs)=1036.8 µs transmission time per OAM frame.

As shown in FIGS. 4-5, the OAM frame time may take between 43.2 µs to 1036.8 µs depending on the number of RS frames compared to the refresh cycles.

Back to FIG. 2, the OAM frame 200 can be accepted when certain criteria can be satisfied. For example, all fields of the OAM frame may be rejected and the OAM frame can be ignored if any of the following occurs: 1) incorrect parity on any of the 12 symbols, 2) incorrect CRC16, or 3) uncorrectable RS frame on any of the 12 symbols. All the OAM fields shall retain their value and, are not updated when a rejected OAM frame is received.

The PHY current health is sent to the link partner on a per-OAM-frame basis using the SNR<1:0> bits. The link partner can thus have an early indication of potential problems that may cause the PHY to drop the link or have high error rates. If EEE is implemented there may be a case where a PHY's receiver can no longer keep good SNR based on quiet/refresh cycles. Instead of dropping the link, the PHY can attempt to recover by forcing the link partner to exit LPI in its egress direction so that the PHY can receive normal activity to recover. This can be accomplished by transmitting SNR<1:0> with a value of 01.

If a PHY receives SNR<1:0> set to 01 by its link partner, then it cannot enter into LPI in the egress direction. If the PHY is already in LPI, then the PHY must immediately exit LPI.

The PingTx bit 212 is set based on the value in a variable mr_tx_ping. The PingRx bit 213 is set based on the latest PingTx 212 received from the link partner. The value in rm_rx_ping is set based on the received PingRx from the link partner. The user can determine that the link partner OAM is operating properly by toggling mr_tx_ping and observing mr_rx_ping matches after a short delay. The Ping bits 212-213 are updated on a per OAM frame basis.

Unlike the PHY health indicator and the ping function which operates on a per-OAM-frame basis, the OAM message exchange can operate on a per-OAM-message basis that can occur over many OAM frames. The OAM message exchange mechanism allows a management entity attached to a PHY and its peer attached to the link partner to asynchronously pass OAM messages and verify its delivery. For example, as shown in FIG. 1, an OAM message (e.g., 103) can first be written into the OAM transmit registers 112*a* in the PHY 120*a*. The OAM message 103 is then read out of the OAM transmit registers 112*a* atomically and transmitted to a link partner. After the link partner receives the OAM message it transfers it into the link partner's OAM receive registers 113*b* and also sends an acknowledge back to the PHY indicating that the next OAM message can be transmitted. One OAM message can be loaded into the OAM transmit registers while another OAM message is being transmitted by the PHY to the link partner while yet another OAM message is being read out at the link partner's OAM receive registers. The exchange of OAM messages can occur concurrently and bi-directionally.

The transfers between the management entities 110*a-b* can be done asynchronously. On the transmit side, the variable mr_tx_valid=0 indicates that the next OAM message can be written into the OAM transmit registers. Once the registers are written, the management entity sets the status variable mr_tx_valid to 1 to indicate that the OAM transmit registers 112*a* contains a valid OAM message. Once the message is read out atomically, the state machine 114*a* clears the mr_tx_valid to 0 to indicate that the registers are ready to accept the next OAM message.

On the receive side, a status variable mr_rx_lp_valid indicates that a valid OAM message can be read from the OAM receive registers 113*b*. Once these registers are read, the status variable mr_rx_lp_valid should be cleared to 0 to indicate that the registers are ready to receive the next OAM message. If mr_rx_lp_valid is not cleared, then the OAM message transfer may eventually stall since the sender cannot send new OAM messages if the receiver does not acknowledge that a OAM message has been transferred into the OAM receive registers 112*b*.

The management entities 110*a-b* can asynchronously read the status variables mr_tx_valid and mr_rx_lp_valid to know when OAM messages can be transferred in and out of the OAM registers.

The toggle bit 222 alternates between 0 and 1, which lets the management entity determine which OAM message is being referred to. Examples of the toggle bit 222 transitioning rules between one OAM frame to the next OAM frame can be shown in Table 1 below:

TABLE 1

Example Toggle Bit Transition Rules.

| Previous Valid | Previous Toggle | Current Valid | Current Toggle | Description |
|---|---|---|---|---|
| 0 | 0 | 0 | 0 | No valid OAM message |
| 0 | 0 | 0 | 1 | Illegal transition |
| 0 | 0 | 1 | 0 | New OAM message starting |
| 0 | 0 | 1 | 1 | Illegal transition |
| 0 | 1 | 0 | 0 | Illegal transition |
| 0 | 1 | 0 | 1 | No valid OAM message |
| 0 | 1 | 1 | 0 | Illegal transition |
| 0 | 1 | 1 | 1 | New OAM message starting |
| 1 | 0 | 0 | 0 | Illegal transition |
| 1 | 0 | 0 | 1 | Received acknowledge, no |
| 1 | 0 | 1 | 0 | Repeating current OAM message, waiting for |
| 1 | 0 | 1 | 1 | Previous OAM message |
| 1 | 1 | 0 | 0 | Received acknowledge, no |
| 1 | 1 | 0 | 1 | Illegal transition |
| 1 | 1 | 1 | 0 | Previous OAM message |
| 1 | 1 | 1 | 1 | Repeating current OAM message, waiting for link partner's acknowledge |

A management interface can be used to communicate OAM information to the management entity 110*a-b*. Management Data Input/Output (MDIO) interface shall be provided as the logical interface to access the device registers for OAM and other management purposes. Table 2 provides an example mapping of state diagram variables to management registers.

TABLE 2

Example State Variables to OAM Register Mapping

| State diagram variable | Name | Register mapping |
|---|---|---|
| mr_tx_valid | OAM Message | 3.REG0.15 |
| mr_tx_toggle | Toggle Value | 3.REG0.14 |
| mr_tx_received | OAM Message | 3.REG0.13 |
| mr_tx_received_toggle | Received | 3.REG0.12 |
| mr_tx_message_num[3:0] | Message Number | 3.REG0.11:8 |
| mr_rx_ping | Ping Received | 3.REG0.3 |
| mr_tx_ping | Ping Transmit | 3.REG0.2 |
| mr_tx_SNR[1:0] | Local SNR | 3.REG0.1:0 |
| mr_tx_message[7:0] | OAM Message 0 | 3.REG1.7:0 |
| mr_tx_message[15:8] | OAM Message 1 | 3.REG1.15:8 |
| mr_tx_message[23:16] | OAM Message 2 | 3.REG2.7:0 |
| mr_tx_message[31:24] | OAM Message 3 | 3.REG2.15:8 |
| mr_tx_message[39:32] | OAM Message 4 | 3.REG3.7:0 |
| mr_tx_message[47:40] | OAM Message 5 | 3.REG3.15:8 |
| mr_tx_message[55:48] | OAM Message 6 | 3.REG4.7:0 |
| mr_tx_message[63:56] | OAM Message 7 | 3.REG4.15:8 |
| mr_rx_lp_valid | Link Partner | 3.REG5.15 |
| mr_rx_lp_toggle | Link Partner | 3.REG5.14 |
| mr_rx_lp_message_num[3:0] | Link Partner | 3.REG5.11:8 |
| mr_rx_lp_SNR[1:0] | Link Partner | 3.REG5.1:0 |
| mr_rx_lp_message[7:0] | Link Partner | 3.REG6.7:0 |
| mr_rx_lp_message[15:8] | Link Partner | 3.REG6.15:8 |
| mr_rx_lp_message[23:16] | Link Partner | 3.REG7.7:0 |
| mr_rx_lp_message[31:24] | Link Partner | 3.REG7.15:8 |

TABLE 2-continued

Example State Variables to OAM Register Mapping

| State diagram variable | Name | Register mapping |
|---|---|---|
| mr_rx_lp_message[39:32] | Link Partner | 3.REG8.7:0 |
| mr_rx_lp_message[47:40] | Link Partner | 3.REG8.15:8 |
| mr_rx_lp_message[55:48] | Link Partner | 3.REG9.7:0 |
| mr_rx_lp_message[63:56] | Link Partner | 3.REG9.15:8 |

Table 3 provides example register bits for the OMA transmit registers (e.g., see 112*a-b*).

TABLE 3

Example OAM Transmit Register

| Bit(s) | Name | Description | R/W |
|---|---|---|---|
| 3.REG0.15 | OAM Message Valid | Used to indicate message data in registers 3.REG0.11:8, 3.REG1, 3.REG2, 3.REG3, and 3.REG4 are valid and ready to be atomically loaded. | R/W, SC |
| 3.REG0.14 | Toggle Value | Toggle value to be transmitted with message. This bit is | RO |
| 3.REG0.13 | OAM Message | 1 = OAM message reveived by link | RO |
| 3.REG0.12 | Received Message Toggle | Toggle value of message that was | RO |
| 3.REG0.11:8 | Message Number | User defined message | R/W |
| 3.REG0.7:4 | Reserved | Set to 0s | R/W |
| 3.REG0.3 | Ping Received | Received PingTx value from latest good OAM | RO |
| 3.REG0.2 | Ping Transmit | Ping value to send to | R/W |
| 3.REG0.1:0 | Local SNR | 00 - PHY link is dying and will drop link and re☐ link within 2 to 4 ms after the end of the current OAM frame. 01 - LPI refresh insufficient for maintain PHY SNR. Request link partner to exit LPI and send idles (used only when EEE is enabled). 10 - PHY SNR is marginal. 11 - PHY SNR is good. | RO |

Table 4 provides example register bits for the OMA message registers (e.g., see 101-103).

TABLE 4

Example OAM Message Register

| Bit(s) | Name | Description | R/W |
|---|---|---|---|
| 3.REG1.15:8 | OAM Message 1 | Message byte 1. LSB transmitted first. | R/W |
| 3.REG1.7:0 | OAM Message 0 | Message byte 0. LSB transmitted first. | R/W |
| 3.REG2.15:8 | OAM Message 3 | Message byte 3. LSB transmitted first. | R/W |
| 3.REG2.7:0 | OAM Message 2 | Message byte 2. LSB transmitted first. | R/W |
| 3.REG3.15:8 | OAM Message 5 | Message byte 5. LSB transmitted first. | R/W |

TABLE 4-continued

Example OAM Message Register

| Bit(s) | Name | Description | R/W |
|---|---|---|---|
| 3.REG3.7:0 | OAM Message 4 | Message byte 4. LSB transmitted first. | R/W |
| 3.REG4.15:8 | OAM Message 7 | Message byte 7. LSB transmitted first. | R/W |
| 3.REG4.7:0 | OAM Message 6 | Message byte 6. LSB transmitted first. | R/W |

Table 5 provides example register bits for the OMA receive registers (e.g., see 113a-b).

TABLE 5

Example OAM Receive Register

| Bit(s) | Name | Description | R/W |
|---|---|---|---|
| 3.REG5.15 | Link Partner OAM Message Valid | Used to indicate message data in registers 3.REG5.11:8, 3.REG6, 3.REG7, 3.REG8, and 3.REG9 are valid and ready to be atomically loaded. This bit shall self clear when registers 3.REG9 is read. 1 = Message data in registers are valid 0 = Message data in registers are not valid | RO, SC |
| 3.REG5.14 | Link Partner Toggle Value | Toggle value received with message. | RO |
| 3.REG5.13:12 | Reserved | Reserved 0s | RO |
| 3.REG5.11:8 | Link Partner Message Number | Message number from link partner | RO |
| 3.REG5.7:2 | Reserved | Reserved 0s | RO |
| 3.REG5.1:0 | Link Partner SNR | 00 - PHY link is dying and will drop link and re☐ link within 2 to 4 ms after the end of the current OAM frame. 01 - LPI refresh insufficient for maintain PHY SNR. Request link partner to exit LPI and send idles (used only when EEE is enabled). 10 - PHY SNR is marginal. 11 - PHY SNR is good. | RO |

Table 4 provides example register bits for link partner OMA message registers (e.g., see 104-106).

TABLE 6

Example Link Partner OAM Message Register

| Bit(s) | Name | Description | R/W |
|---|---|---|---|
| 3.REG6.15:8 | Link Partner OAM Message 1 | Message byte 1. LSB transmitted first. | RO |
| 3.REG6.7:0 | Link Partner OAM Message 0 | Message byte 0. LSB transmitted first. | RO |
| 3.REG7.15:8 | Link Partner OAM Message 3 | Message byte 3. LSB transmitted first. | RO |
| 3.REG7.7:0 | Link Partner OAM Message 2 | Message byte 2. LSB transmitted first. | RO |
| 3.REG8.15:8 | Link Partner OAM Message 5 | Message byte 5. LSB transmitted first. | RO |
| 3.REG8.7:0 | Link Partner OAM Message 4 | Message byte 4. LSB transmitted first. | RO |

TABLE 6-continued

Example Link Partner OAM Message Register

| Bit(s) | Name | Description | R/W |
|---|---|---|---|
| 3.REG9.15:8 | Link Partner OAM Message 7 | Message byte 7. LSB transmitted first. | RO |
| 3.REG9.7:0 | Link Partner OAM Message 6 | Message byte 6. LSB transmitted first. | RO |

Figure 6:
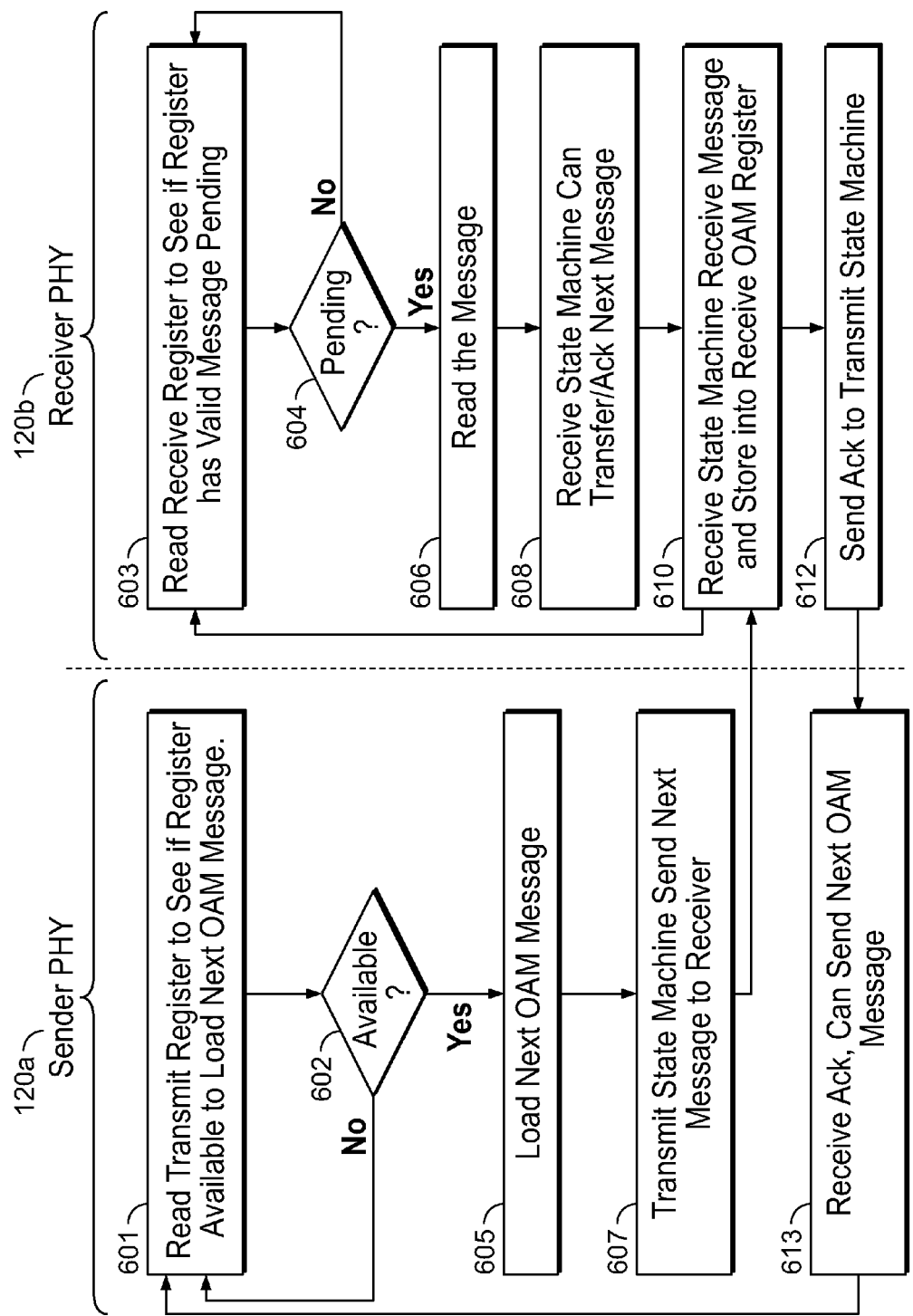
FIG. 6 provides an example logic flow diagram illustrating the asynchronous interaction between a sender PHY and a receiver PHY as shown in FIG. 1.

FIG. 6 provides an example logic flow diagram illustrating the asynchronous interaction between a sender PHY and a receiver PHY as shown in FIG. 1. For example, at 601, the PHY of a sender (such as 120a in FIG. 1) may constantly, intermittently, or periodically read an OAM transmit register (e.g., 112a in FIG. 1) to see if the transmit OAM register is available to load the next OAM message (e.g., see 103 in FIG. 1). If available at 602, the transmit OAM register may load the next OAM message at 605. Otherwise, the sender may keep reading the transmit OAM register until it is available.

The receiver PHY (e.g., see 120b in FIG. 1) may asynchronously read the receive OAM register (e.g., 113b in FIG. 1) to see if the receive OAM register has any valid message pending. If there is a message pending at 604, the receiver may read the message at 606. Otherwise, the receiver may keep reading the receive OAM register until there is a valid message being loaded, and will not transfer the next message or acknowledge the next message until the receive OAM register has been read.

At the sender PHY, the transmit state machine (e.g., see 114a in FIG. 1) may send the next message to the receiver (e.g., see 102 in FIG. 1) at 607. The transmit state machine will not send next message until the receive state machine is ready for it and only if a valid message is loaded into the Transmit OAM register. The receive state machine (e.g., see 115b in FIG. 1) at the receiver may receive the message and store it into the receive OAM register (e.g., 113b in FIG. 1), at 610. The receiver may then proceed with 603 to read the receive OAM register. When the message is received correctly by the state machine and stored into the Receive OAM register, an acknowledgement (e.g., 125 in FIG. 1) is sent back to let the other PHY know that the message was received correctly, at 612. The transmit state machine (e.g., 114a in FIG. 1) knows it can send the next OAM message if it receives an acknowledgement.

As shown in FIG. 1, the pipe may eventually stall with three OAM messages (e.g., 101-103) if the receiver or an agent of the receiver does not read OAM message out, which may cause that the acknowledgement cannot be sent. The two management entities (as a sender or receiver) may not need to be tightly coupled. The two entities may poll to see whether OAM registers are available to write or read.

Figure 7:
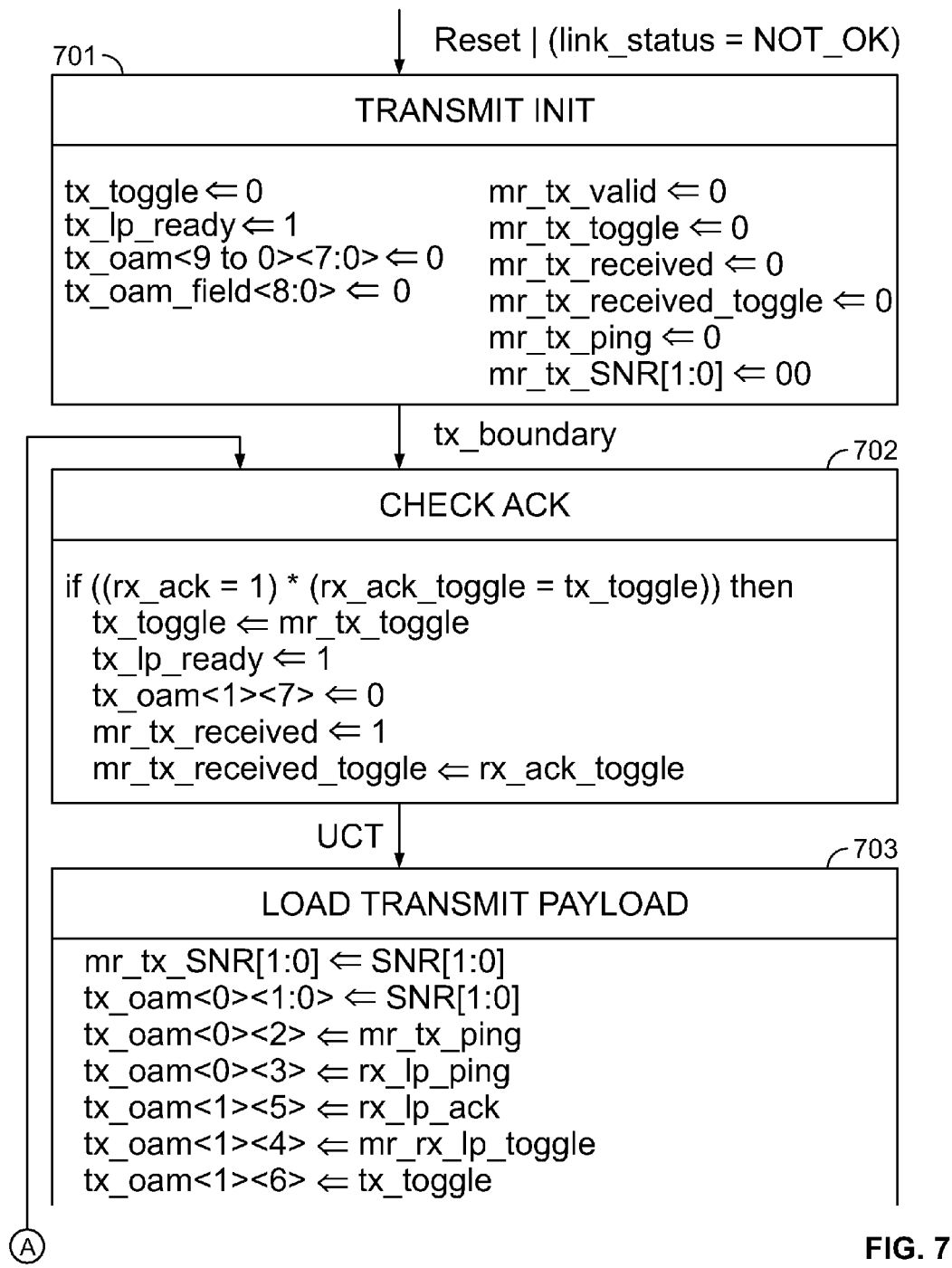
FIG. 7 shows the process to transmit an OAM symbol. The transmit process may be initiated with setting variable values at 701.
Figure 7:
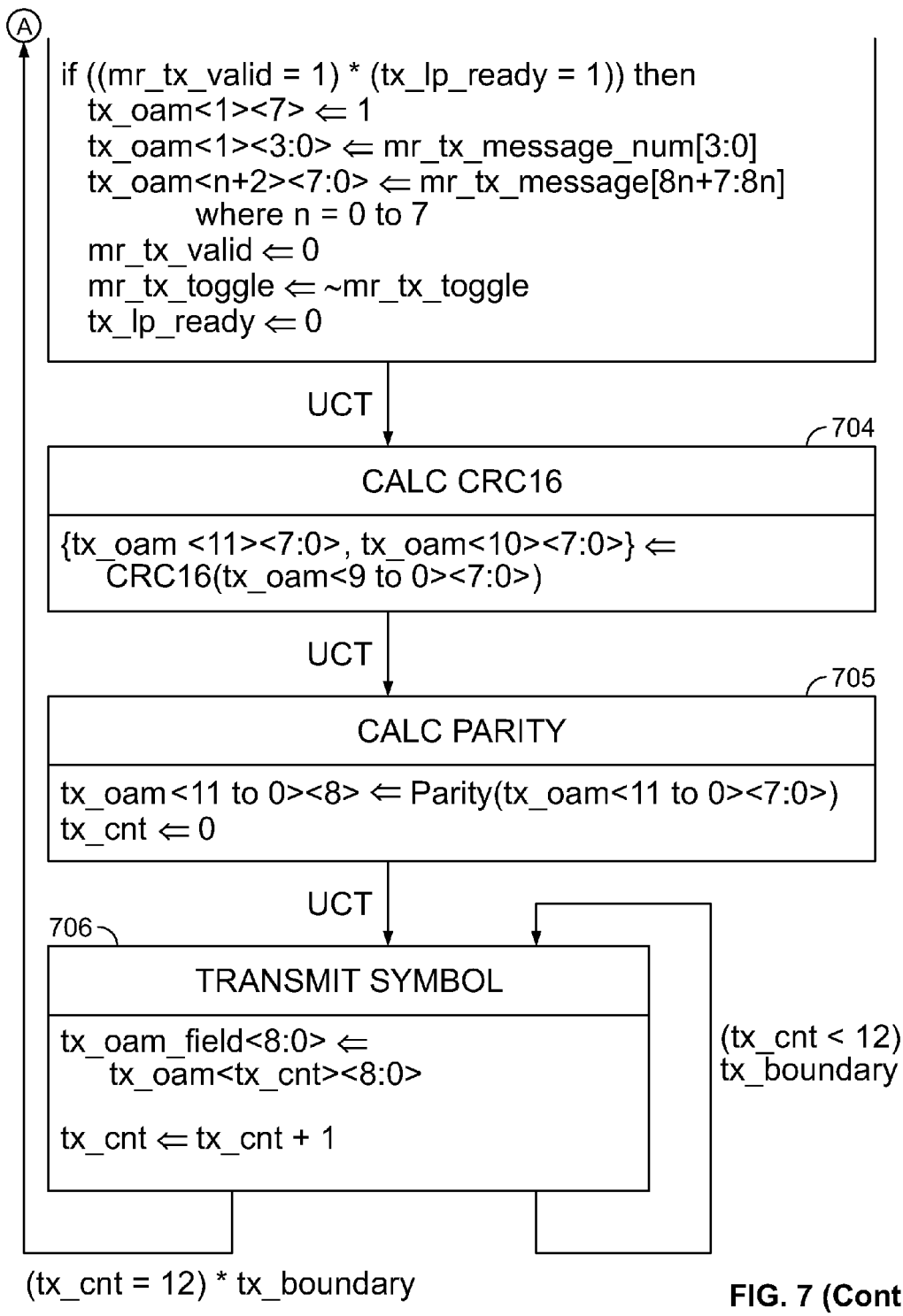
Figure 8:
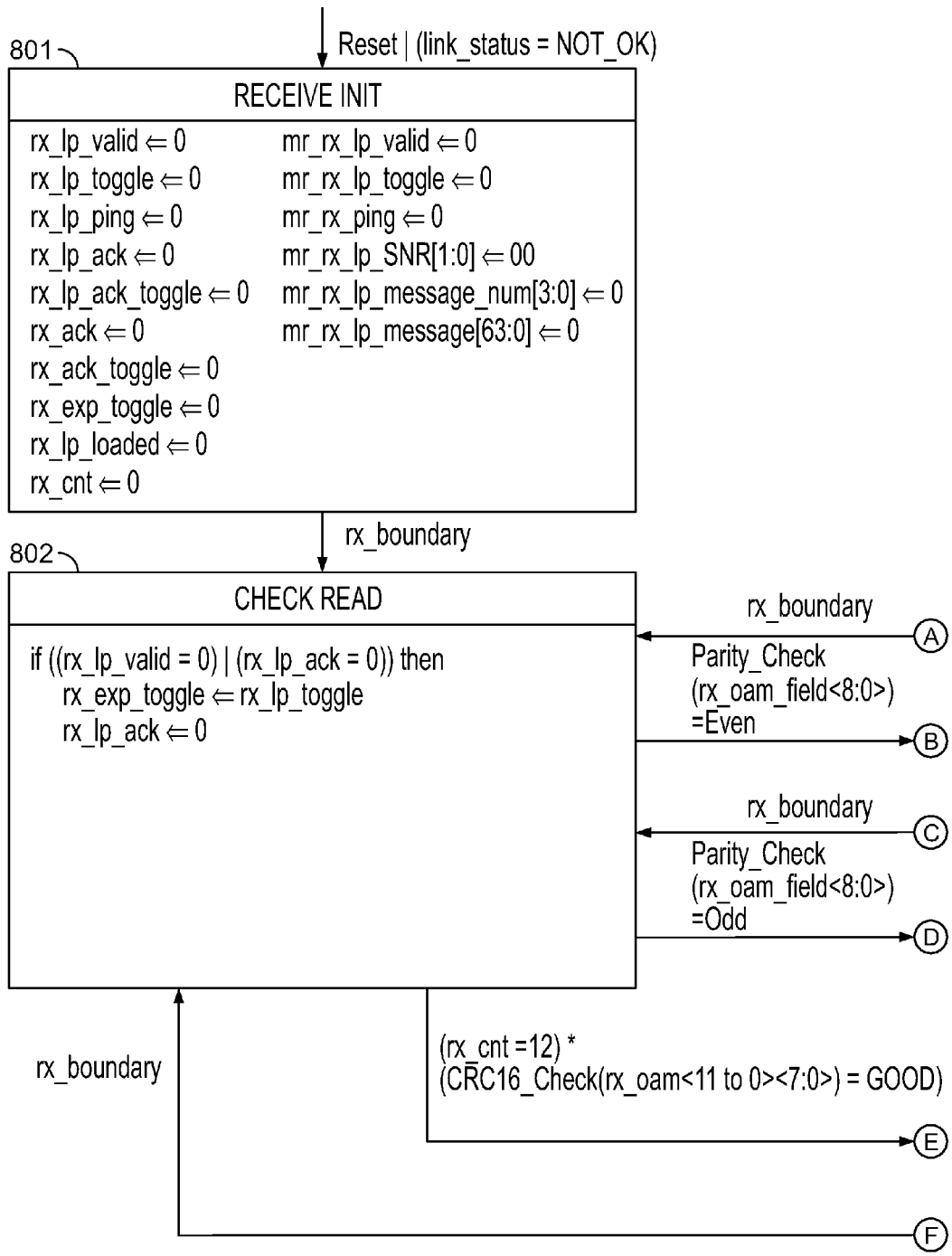
FIG. 8 shows the process to receive an OAM symbol. The receive process may be initiated with setting variable values as shown at 801.
Figure 8:
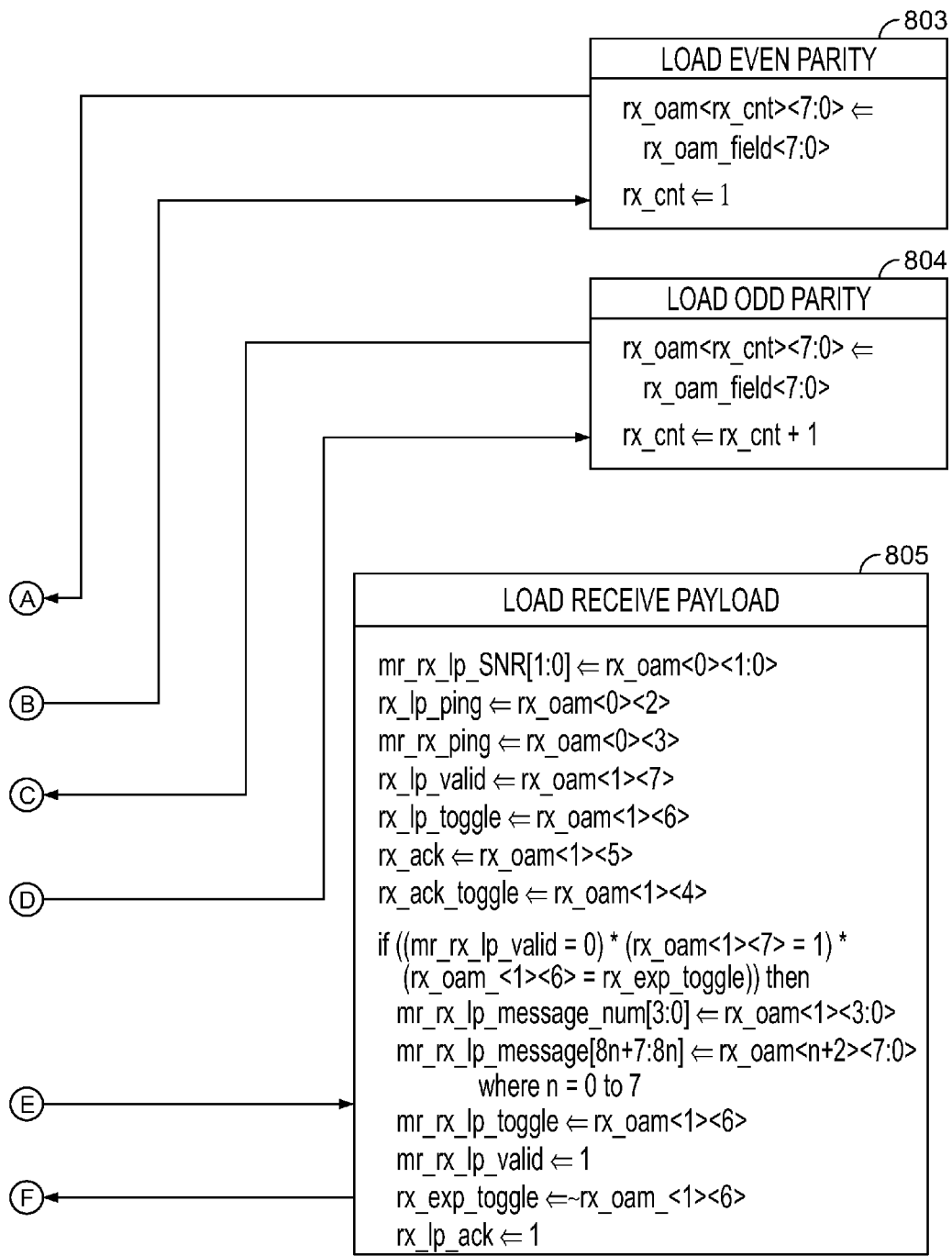

FIGS. 7-8 provide example state diagrams of the state variables illustrating detailed state transitions during asynchronous interactions between two shown in FIG. 1. A series of state diagram variables can be defined as follows:

link_status: status of the underlying medium (values: FAIL—Underlying receive channel is not intact; OK—Underlying receive channel is intact and enabled);

mr_rx_lp_message[63:0]: eight-byte OAM message from the link partner; the value in this variable is valid only when mr_rx_lp_valid is 1;

mr_rx_lp_message_num[3:0]: four-bit message number from the link partner. The value in this variable is valid only when mr_rx_lp_valid is 1.

mr_rx_lp_SNR[1:0]: link partner health status (values: 00—PHY link is dying and will drop link and re-link within two to four ms after the end of the current OAM frame; 01—LPI refresh insufficient for maintain PHY SNR. Request link partner to exit LPI and send idles (used only when EEE is enabled); 10—PHY SNR is marginal; 11—PHY SNR is good. The threshold for the status is implementation-dependent.)

mr_rx_lp_toggle: the toggle bit value associated with the eight-byte OAM message from the link partner (values: The toggle bit alternates between 0 and 1.)

mr_rx_lp_valid: indicates whether OAM message in mr_rx_lp_message[63:0], mr_rx_lp_message_num[3:0] and the toggle bit in mr_rx_lp_toggle is valid or not. This variable should be cleared when mr_rx_lp_message[63:48] is read and is not explicitly shown in the state machine. The clearing of this variable indicates to the state machine that the OAM message is read by the user and the state machine can proceed to load in the next OAM message (values: 0—invalid; 1—valid).

mr_rx_ping: echoed ping value from the link partner (values: the value can be 0 or 1.)

mr_tx_message[63:0]: eight-byte OAM message transmit by the PHY. The value in this variable is valid only when mr_tx_valid is 1.

mr_tx_message_num[3:0]: four-bit message number transmit by the PHY. The value in this variable is valid only when mr_tx_valid is 1.

mr_tx_ping: ping value transmit by the PHY (values: the value can be 0 or 1).

mr_tx_received: indicates whether the most recently transmitted OAM message with a toggle bit value of mr_tx_received toggle was received, read, and acknowledged by the link partner (values: 0—OAM message not received and read by the link partner; 1—OAM message received by the link partner).

mr_tx_received toggle: toggle bit value of the OAM message that was received, read, and most recently acknowledged by the link partner. This bit is valid only if mr_tx_received is 1.

Values: The value can be 0 or 1.

Mr_tx_SNR[1:0]: status register indicating PHY health status (values: 00—PHY link is dying and will drop link and re-link within two to four ms after the end of the current OAM frame; 01—LPI refresh insufficient for maintain PHY SNR. Request link partner to exit LPI and send idles (used only when EEE is enabled); 10—PHY SNR is marginal; 11—PHY SNR is good. The threshold for the status is implementation dependent.) mr_tx_toggle: the toggle bit value associated with the eight-byte OAM message transmitted by the PHY. The value is automatically set by the state machine and cannot be set by the user. This bit should be read and recorded prior to setting mr_tx_valid to 1 (values: The toggle bit alternates between 0 and 1.)

mr_tx_valid: indicates whether OAM message in mr_tx_message[63:0] and mr_rx_lp_message_num[3:0] is valid or not. This register will be cleared by the state machine to indicate whether the next OAM message can be written into the registers (values: 0—invalid; 1—valid).

SNR[1:0]: PHY health status (values: 00—PHY link is dying and will drop link and re-link within two to four ms after the end of the current OAM frame; 01—LPI refresh insufficient for maintain PHY SNR. Request link partner to exit LPI and send idles (used only when EEE is enabled); 10—PHY SNR is marginal; 11—PHY SNR is good.)

rx_ack: acknowledge from link partner in response to PHY's OAM message (values: 0—no acknowledge; 1—acknowledge).

rx_ack_toggle: the toggle value corresponding to the PHY's OAM message that the link partner is acknowledging. This value is valid only if the rx_ack is set to 1 (values: the toggle bit can take on values of 0 or 1.)

rx_boundary: this variable is set to true whenever the receive data stream reaches the end of a Reed Solomon frame during normal operation, or at the end of a received refresh cycle during low power idle operation. This variable is set to false at other times (values: false—receive stream not at a boundary end; true—receive stream at a boundary end.)

rx_exp_toggle: this variable holds the expected toggle value of the next OAM message. This is normally the opposite value of the current toggle value, but shall reset on error conditions where two back-to-back OAM messages separated by OAM frames without a valid message have the same toggle value (values: The toggle bit can take on values of 0 or 1.)

rx_lp_ack: acknowledge from PHY in response to link partner's OAM message, and indicates whether valid OAM message from the link partner has been atomically sampled into the PHY's registers (values: 0—no acknowledge/not sampled; 1—acknowledge/sampled).

rx_lp_ping: ping value received from the link partner that should be looped back (values: the value can be 0 or 1.

rx_lp_toggle: the toggle bit value in the previous OAM frame received from the link partner (values: The toggle bit alternates between 0 and 1.)

rx_lp_valid: indicates whether OAM message in previous OAM frame received from the link partner is valid or not (values: 0—invalid; 1—valid).

rx_oam_field<8:0>: nine-bit OAM symbol extracted from a received Reed Solomon frame during normal operation, or from a received refresh cycle during low power idle operation.

rx_oam<11 to 0><8:0>: raw 12 symbol OAM frame received from the link partner.

tx_boundary: this variable is set to true whenever the transmit data stream reaches the start of a Reed Solomon frame during normal operation, or at the start of a transmit refresh cycle during low power idle operation. This variable is set to false at other times (values: false—transmit stream not at a boundary end; true—transmit stream at a boundary end).

tx_lp_ready: indicates whether the link partner is ready to receive the next OAM message from the PHY. If ready, then the PHY will load the next OAM message from the registers and begin transmitting them (values: 0—not ready: 1—ready).

tx_oam_field<8:0>: nine-bit OAM symbol inserted into a transmitted Reed Solomon frame during normal operation, or into a transmitted refresh cycle during low power idle operation.

tx_oam<11 to 0><8:0>: raw 12 symbol OAM frame transmitted from the PHY.

tx_toggle: the toggle bit value being send in the current OAM frame transmitted by the PHY (values: the value can be 0 or 1.)

rx_cnt: OAM frame receive symbol count (values: the value can be any integer from 0 to 12 inclusive).

tx_cnt: OAM frame transmit symbol count (values: the value can be any integer from 0 to 12 inclusive).

CRC16 (10 bytes): this function outputs a 16-bit CRC value using 10-byte input.

CRC16_Check (12 bytes): this function checks whether the 12-byte frame has the correct CRC16 as defined in clause 97.6.2.2.10 (values: BAD—CRC16 check is bad; GOOD—CRC16 check is good).

Parity (12 bytes): this function outputs 12 parity bits, one for each of the 12 input bytes. An even parity bit is output for the first byte, and odd parity bits are output for each of the remaining 11 bytes.

Parity_Check (9-bit symbol): this function calculates the bit parity of the 9-bit symbol (values: Even—symbol has even parity; Odd—symbol has odd parity).

FIG. 7 shows the process to transmit an OAM symbol. The transmit process may be initiated with setting variable values at 701. The sender (e.g., 102a in FIG. 6) may check acknowledgement with the example code segment shown at 702, and then load transmit payload at 703. The sender may then calculate CRC16 at 704 (e.g., see 228 in FIG. 2), and calculate parity bits at 705. The sender may then transmit the 12-byte OAM message include 12 symbols at 706.

FIG. 8 shows the process to receive an OAM symbol. The receive process may be initiated with setting variable values as shown at 801. The receiver (e.g., 102b in FIG. 6) may check the read register at 802 (e.g., similar to 603 in FIG. 6), and may load an even parity check at 803 or an odd parity check at 804, based on the symbol. The receiver may then load the receive payload at 805.

In further embodiments of the disclosure, the OAM model discussed in connection with FIGS. 1-8 can be used to handle an idle request during LPI. In the current 1000BASE-T1, fast retrain is not defined, and may not be compatible with 1G media access control (MAC), as no definition of link interruption over Gigabit Media Independent Interface (GMII) under IEEE 802.3 standards has been defined. Specifically, LPI can be asymmetric in the current 1000BASE-T1, making it difficult to indicate link interruption to MAC via GMII while traffic is being received on GMII. During an LPI mode, it may be beneficial to request the link partner to stop sending quiet/refresh and send normal idles if the local receiver is having difficulty. For example, link partners may send quiet/refreash signals 1.67% of the time. When the digital signal processing (DSP) components are vulnerable and may drift during LPI, a request for normal idles can allow the unhealthy DSP to relock instead of dropping a link. Thus, in this disclosure, the OAM model can be used to request normal idles.

In one implementation, OAM frames can be passed during LPI. For example, if an OAM communication channel includes PHY A and PHY B, PHY B has a transmit path in LPI, and PHY A has a receive path in LPI. Then PHY A can use its transmit OAM channel health bit to represent the SNR condition, e.g., 11—SNR OK, 10—SNR marginal, 01—request link partner to exit LPI, and 00—link is dying and will drop and re-link within 2-4 ms. If PHY B sees PHY A has the SNR health bit to be 01, the transmit path of PHY B may need to exit LPI as soon as possible. PHY B transmit path may not enter LPI as long as the SNR health bit from PHY A remains to be 01. PHY B may re-enter LPI when the SNR health bit from PHY A changes. The following table can illustrate the SNR health bit of PHY A and the transmit path status for PHY B:

TABLE 7

| SNR Health Bit and Path Status | | |
|---|---|---|
| MAC B | PHY A's SNR | PHY B's Transmit Path |
| Normal | Don't care | Normal Traffic |
| LPI | Not 01 | LPI/Quiet-Refresh |
| LPI | 01 | Normal Idles |

Figure 9:
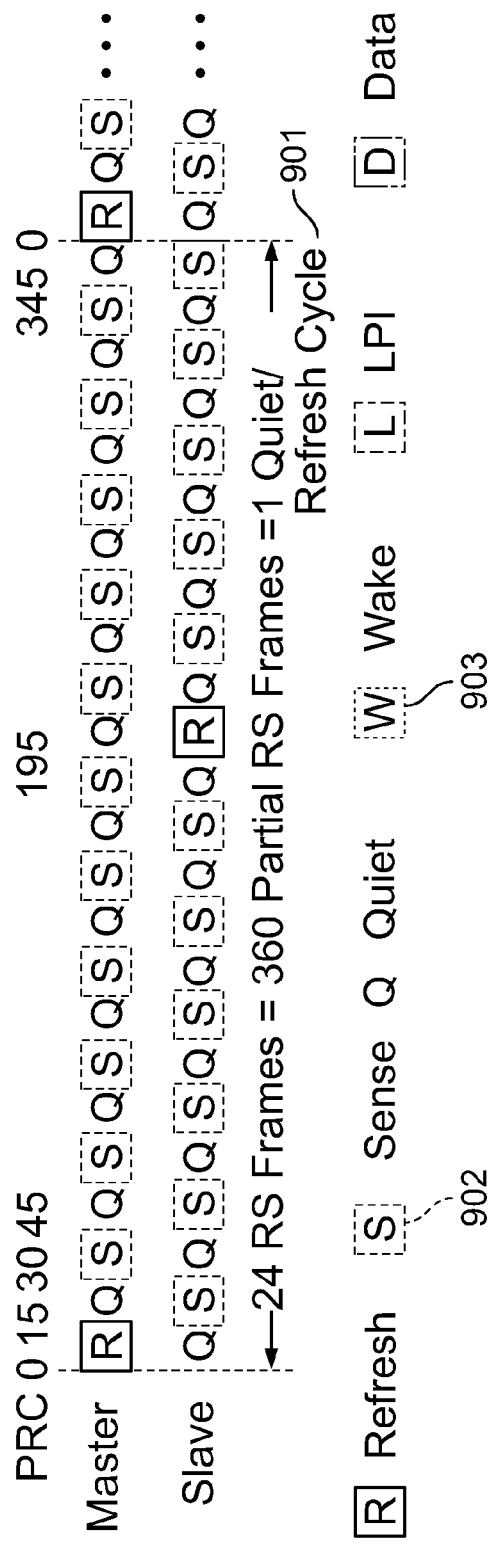
FIG. 9 shows a diagram illustrating aspects of a normal lower power idle (LPI) state.

FIG. 9 shows a diagram illustrating aspects of a normal LPI. For example, within the quiet/refresh cycle 901, LPI may need to exit under 16.5 μs. The exit process, however, can only start during a sense window 902. Link partners can send wake 903 only during PHY's sense window 902. Only one RS frame of idles is needed for wake 903. Each square below is 3.6 μs and aligns exactly to a Reed Solomon frame boundary.

Figure 10:
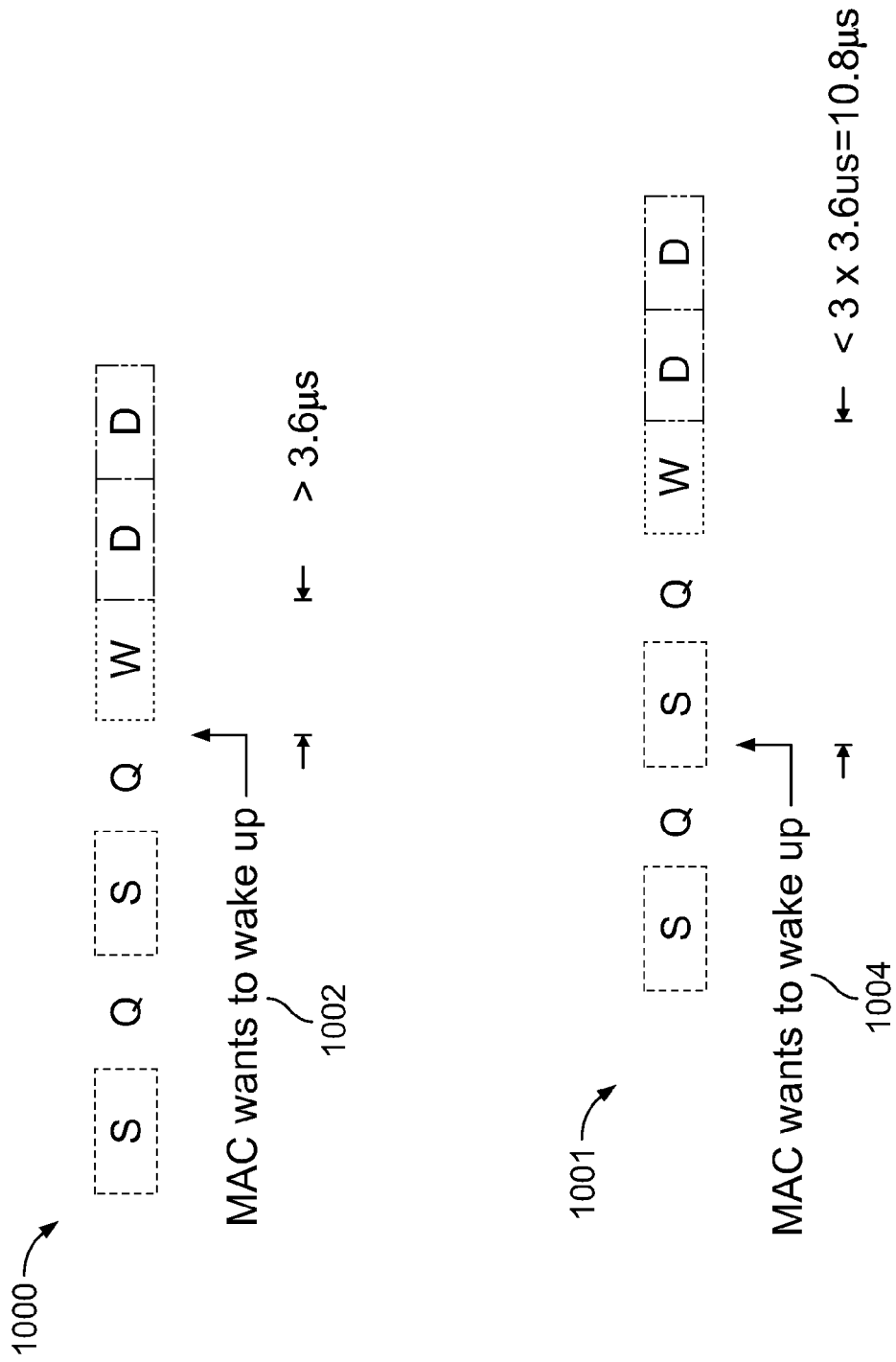
FIG. 10 shows a diagram illustrating aspects of a normal wake-up time.

FIG. 10 shows a diagram illustrating aspects of a normal wake-up time. In the example shown at 1000, the MAC may wake up just before the sense window, e.g., at 1002, which is the optimal case. In a different example shown at 1001, the MAC can just miss the sense window, e.g., at 1004, which is the least favorable situation.

Figure 11:
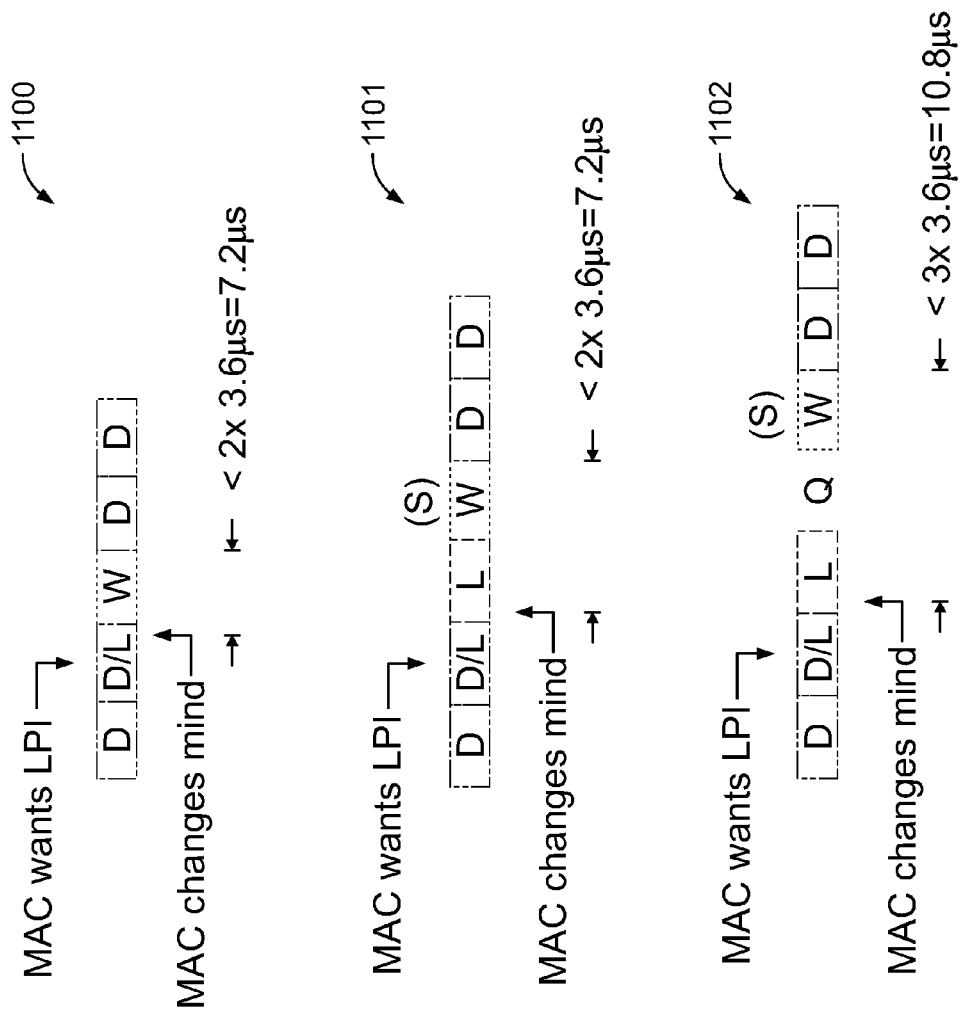
FIG. 11 shows a diagram illustrating aspects of the wake up time for a normal media access control (MAC) to change mind.

FIG. 11 shows a diagram illustrating aspects of the wake-up time for a normal MAC to change mind. In the example 1100, MAC can change its mind before the full frame of RS LPI is sent. At 1101, MAC can change its mind after the full frame RS LPI is sent, which can be the optimal scenario. Or alternatively, at 1102, in a less optimal scenario, MAC can change its mind after the full frame RS LPI is sent but needs to wait for a quiet period afterwards.

Figure 12:
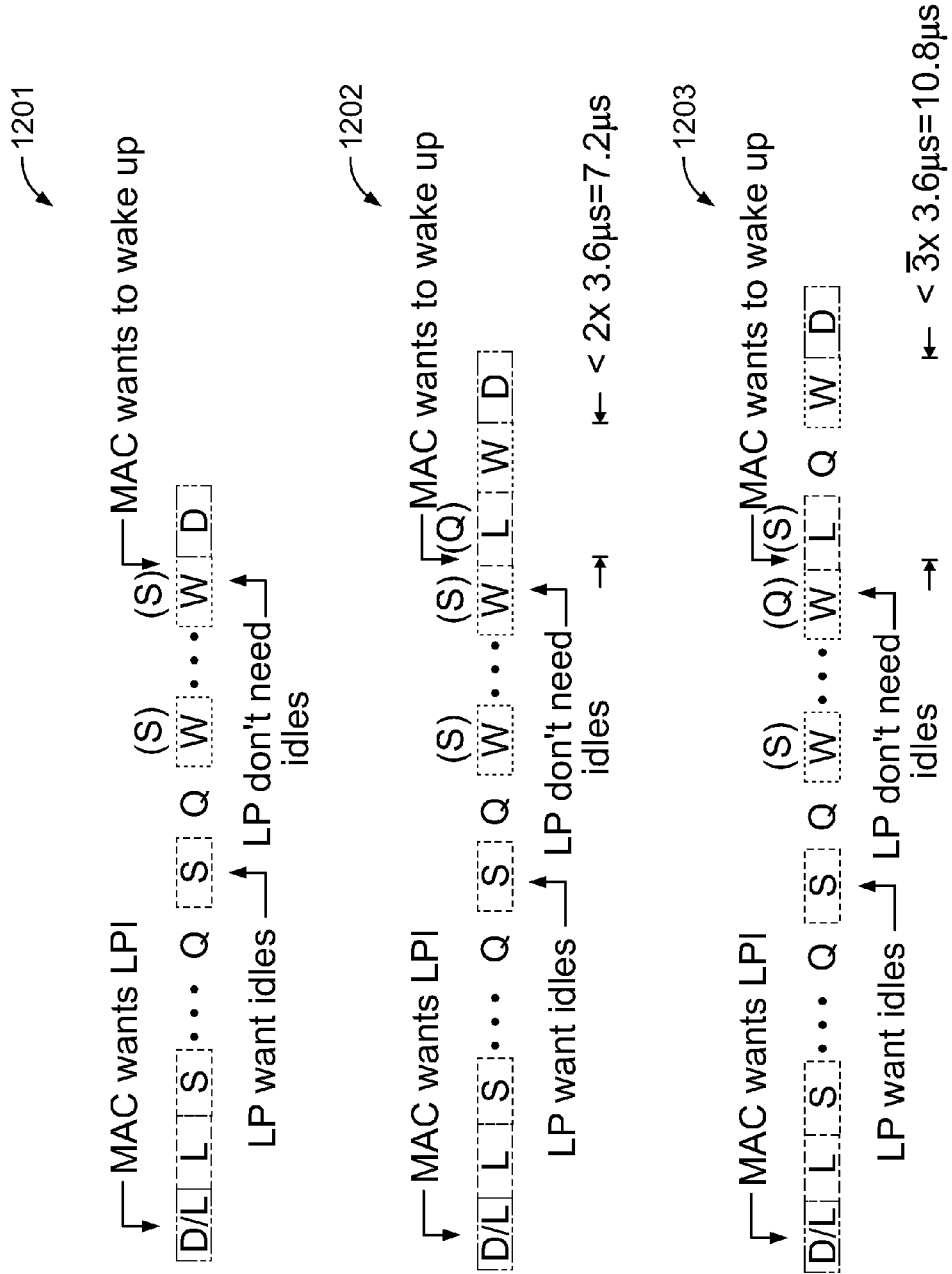
FIG. 12 shows a diagram illustrating aspects of re-entering LPI followed by MAC exiting LPI within an OAM model.

FIG. 12 shows a diagram illustrating aspects of re-entering LPI followed by MAC exiting LPI within an OAM model. At 1201, MAC can exit the LPI while the link partner requests idles; thus no or minimum delay may be incurred. At 1202, MAC may exit LPI while the link partner releases PHY from idles via OAM, which is the optimal scenario. Alternatively, in a less optimal scenario, MAC can exit LPI while the link partner releases PHY from idles via OAM but needs to wait for a quiet period afterwards, incurring a longer delay period.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

The foregoing is merely illustrative of the principles of this disclosure, and various modifications can be made without departing from the scope of the present disclosure. The above-described embodiments of the present disclosure are presented for purposes of illustration and not of limitation, and the present disclosure is limited only by the claims that follow.

What is claimed is:

1. A method for operation, administration and maintenance (OAM) of data message transmission, the method comprising:
reading a transmit register of a transmitter associate with a first management entity to determine a transmit status of the transmit register;
loading a data message into the transmit register when the transmit status of the transmit register indicates availability;
embedding the data message as an out-of-band message with physical code sublayer modulation;
transmitting the out-of-band message on the physical code sublayer to a receiver associated with a second management entity,
wherein a transmit state machine of the transmitter and a receive state machine of the receiver establish a handshake to allow the out-of-band message to be passed asynchronously.

2. The method of claim 1, wherein the out-of-band message is used for OAM of the first management entity and the second management entity.

3. The method of claim 1, further comprising:
transferring the data message from the transmit register to a transmit state machine,
wherein the data message is written to the transmit register by the first management entity; and
transmitting the data message from the transmit state machine to a receiver when the receive state machine is ready to receive.

4. The method of claim 1, further comprising:
receiving at the transmit register an acknowledgement signal when the out-of-band message has been successfully received at the receiver.

5. The method of claim 1, further comprising:
transmitting a next data message from the transmitter to the receiver when an acknowledgement of the out-of-band message is received.

6. The method of claim 1, wherein the OAM of data message transmission stalls with up to three data messages without asynchronously reading the pending data message from the receive register.

7. The method of claim 1, wherein the receiver comprises a receive register that is asynchronously read by the second management entity, and
sends an acknowledgement message when the out-of-band message is received error free.

8. The method of claim 1, wherein the first management entity and the second management entity transmit data messages bi-directionally.

9. The method of claim 1, wherein the physical code sublayer modulation is in compliance with the 1000BASE-T1 physical layer standard.

10. The method of claim 1, wherein a first management entity passes a physical layer health information to a link partner, and
the physical layer health information is used to maintain a connection between the physical layer and the link partner.

11. A system for operation, administration and maintenance (OAM) of data message transmission, the system comprising:
a memory unit;
a processor communicatively coupled to the memory unit, the processor being configured to:
read a transmit register of a transmitter associate with a first management entity to determine a transmit status of the transmit register;
load a data message into the transmit register when the transmit status of the transmit register indicates availability;
embed the data message as an out-of-band message with physical code sublayer modulation;
transmit the out-of-band message on the physical code sublayer to a receiver associated with a second management entity,
wherein a transmit state machine of the transmitter and a receive state machine of the receiver establish a handshake to allow the out-of-band message to be passed asynchronously.

12. The system of claim 11, wherein the out-of-band message is used for OAM of the first management entity and the second management entity.

13. The system of claim 11, wherein the processor is further configured to:
transfer the data message from the transmit register to a transmit state machine,
wherein the data message is written to the transmit register by the first management entity; and
transmit the data message from the transmit state machine to a receiver when the receive state machine is ready to receive.

14. The system of claim 11, wherein the processor is further configured to:
receive at the transmit register an acknowledgement signal when the out-of-band message has been successfully received at the receiver.

15. The system of claim 11, wherein the processor is further configured to:
transmit a next data message from the transmitter to the receiver when an acknowledgement of the out-of-band message is received.

16. The system of claim 11, wherein the OAM of data message transmission stalls with up to three data messages without asynchronously reading the pending data message from the receive register.

17. The system of claim 11, wherein the receiver comprises a receive register that is asynchronously read by the second management entity, and
sends an acknowledgement message when the out-of-band message is received error free.

18. The system of claim 11, wherein the first management entity and the second management entity transmit data messages bi-directionally.

19. The system of claim 11, wherein the physical code sublayer modulation is in compliance with the 1000BASE-T1 physical layer standard.

20. A method for operation, administration and maintenance (OAM) of data message transmission, the method comprising:
Loading, at a first management entity, a data message into a transmit register for transmission over a physical layer;
embedding the data message as an out-of-band message with physical code sublayer modulation;
transmitting the out-of-band message on the physical code sublayer to a receiver associated with a second management entity, wherein the first management entity passes a physical layer health status information to a link partner and uses the physical layer health status information to maintain a connection with the link partner.

* * * * *